(12) United States Patent
Walz et al.

(10) Patent No.: US 11,943,846 B2
(45) Date of Patent: Mar. 26, 2024

(54) HEAT-GENERATING ELEMENT AND METHOD FOR ITS PRODUCTION

(71) Applicant: Eberspächer catem GmbH & Co. KG, Herxheim (DE)

(72) Inventors: Kurt Walz, Hagenbach (DE); Michael Niederer, Kappellen-Drusweiler (DE)

(73) Assignee: Eberspächer catem GmbH & Co. KG, Herxheim (DE)

( * ) Notice: Subject to any disclaimer, the term of this patent is extended or adjusted under 35 U.S.C. 154(b) by 609 days.

(21) Appl. No.: 16/905,209

(22) Filed: Jun. 18, 2020

(65) Prior Publication Data

US 2020/0404748 A1 Dec. 24, 2020

(30) Foreign Application Priority Data

Jun. 19, 2019 (DE) .......................... 102019208967.4

(51) Int. Cl.
*H05B 3/86* (2006.01)
*B29C 65/00* (2006.01)
(Continued)

(52) U.S. Cl.
CPC ......... *H05B 3/286* (2013.01); *B29C 65/4835* (2013.01); *B29C 66/47* (2013.01);
(Continued)

(58) Field of Classification Search
CPC ................. B29C 65/4835; B29C 66/47; B29L 2031/779; H05B 2203/011;
(Continued)

(56) References Cited

U.S. PATENT DOCUMENTS 3,774,299 A * 11/1973 Sato .................. B32B 27/34
219/544
4,910,389 A * 3/1990 Sherman ................ H01C 7/027
219/505
(Continued)

FOREIGN PATENT DOCUMENTS

CN 106231700 A 12/2016
CN 110012564 A 7/2019
DE 102017223785 6/2019

*Primary Examiner* — Sang Y Paik
(74) *Attorney, Agent, or Firm* — Boyle Fredrickson S.C.

(57) ABSTRACT

A method for the production of a heat-generating element includes placing in which at least two electrical conductor elements, provided with through holes, onto a film provided with an adhesive mass, pressing the conductor elements against the films such that the mass is forced into the through holes. At least one PTC element is subsequently placed onto one of the conductor elements, and then the other of the conductor elements, together with the film adhering thereto, is placed opposite to the one of the conductor elements onto the PTC element. The invention further relates to a heat-generating element with a PTC element and electrical conductor elements connected thereto in an electrically conductive manner for energizing the PTC element with a different polarity and an electrical insulation that is provided on the outer side thereof with a film and an adhesive mass applied thereto. At least one of the conductor elements is provided with through holes and the mass is at least in part contained in the plane of the conductor element.

9 Claims, 2 Drawing Sheets

(51) Int. Cl.
*B29C 65/48* (2006.01)
*H05B 3/28* (2006.01)
*B29L 31/00* (2006.01)

(52) U.S. Cl.
CPC ... *B29L 2031/779* (2013.01); *H05B 2203/011* (2013.01); *H05B 2203/017* (2013.01); *H05B 2203/02* (2013.01); *H05B 2203/023* (2013.01)

(58) Field of Classification Search
CPC .......... H05B 2203/017; H05B 2203/02; H05B 2203/023; H05B 3/286
USPC ................................ 219/504, 505, 541–549
See application file for complete search history.

(56) References Cited

U.S. PATENT DOCUMENTS

| | | | |
|---|---|---|---|
| 6,084,206 A | 7/2000 | Williamson et al. | |
| 7,667,166 B2 | 2/2010 | Zeyen et al. | |
| 8,395,088 B2 | 3/2013 | Niederer et al. | |
| 10,136,474 B2 | 11/2018 | Bohlender et al. | |
| 2003/0156829 A1* | 8/2003 | Cox | H05B 3/34 |
| | | | 392/390 |
| 2009/0242548 A1* | 10/2009 | Iida | H05B 3/345 |
| | | | 219/529 |
| 2016/0360572 A1 | 12/2016 | Bohlender et al. | |
| 2016/0360573 A1* | 12/2016 | Bohlender | H05B 3/18 |

\* cited by examiner

HEAT-GENERATING ELEMENT AND METHOD FOR ITS PRODUCTION

BACKGROUND OF THE INVENTION

1. Field of the Invention

The present invention relates to a method for the production of a heat-generating element of an electric heating device as well as a heat-generating element as such. The present invention seeks in particular to specify the production of a heat-generating element of an electric auxiliary heater of a motor vehicle and such a heat-generating element. The present invention relates in particular to a method for the production of a heat-generating element with a PTC element and conductor elements attached thereonto on both sides as well as an electrical insulation which is applied onto the conductor elements on the outer side.

2. Background of the Invention

Such a heat-generating element is known from EP 1 916 873 A1. This publication discloses an embodiment in which the conductor element in the form of contact plates is covered on the outer side with an insulation layer formed by a ceramic plate.
In the embodiment of EP 1 916 873 A1, the ceramic plate together with the associated conductor element in the form of a contact plate is connected by injection mold coating to a plastic frame.
EP 1 768 457 A1, EP 3 101 999 A1 and EP 2 873 296 A1, respectively, disclose other solutions in which the electrical insulation in the form of a multilayer insulation layer is glued onto a contact plate forming the conductor element.

Though such an embodiment offers the advantage that the contact plate together with the insulation is joined to form a unit and only this unit must be handled and installed in a position frame, a multi-layered structure, however, from the PTC element to the heat-emitting outer surface arises. Each individual layer must be penetrated by the heat that is to be delivered to the outside. Conduction disturbances for the heat to be dissipated to the outside can arise at any layer. Such resistances degrade the degree of efficiency because the PTC element does not consume power current during excessive heating for reasons of its self-regulating properties. This degrades the degree of efficiency of the PTC element.

SUMMARY

The present invention is based on the object of specifying a simple and therefore economical method for the production of a heat-generating element. The heat-generating element according to the invention is to be easily produced and allow for good heat decoupling of the heat generated by the PTC element to the exterior.
For satisfying the object of the method, electrical conductor elements are placed onto a film provided with an adhesive mass. These electrical conductor elements are placed onto the film spaced from each other. The electrical conductor elements are used to energize a PTC element with different polarity. The adhesive mass is provided on the side of the film on which the conductor elements are placed. After placement of the conductor elements, this then results in a certain adhesion between the conductor elements and the film, which is imparted by the adhesive mass. According to the invention, the conductor elements are provided with through holes. They are electrical conductor elements.

The conductor elements may be pressed against the film such that the mass is forced into the through holes. This results in a close contact between the mass and the conductor elements, so that they are already firmly connected to the film after being pressed against the film.

At least one PTC element is subsequently placed onto one of the conductor elements. The other of the conductor elements together with the adhering film is subsequently placed oppositely disposed to the one of the conductor elements onto the PTC element.

The PTC element is typically applied a metallization on its oppositely disposed main side surfaces. This metallization is used for the surface introduction of the power current into the PTC element.

According thereto, a layer structure arises in which the film forms the respective outer side of the heat-generating element. Disposed on the inner surface of the film facing the PTC element is the adhesive mass. Due to pressing action, the latter is at least in part also disposed n the plane of the conductor element. Disposed between the conductor elements is the PTC element.

The conductor element provided with through holes is typically an electrically conductive element which is formed as a mesh, knitted fabric, perforated sheet metal or stretch metal. In a top view onto the conductor element, i.e. a view perpendicular to the main side surface of the strip-shaped conductor element, the latter is usually at least in part transparent. The through holes usually completely pass through the conductor element in the height direction. The through holes may be provided on a piece of sheet metal in a uniform pattern distributed over the entire surface of the conductor element that abuts against the PTC element.

A wire mesh within the meaning of the present invention is typically formed by wire-woven material. One wire strand is there respectively placed alternately beneath or above other strands extending transverse to this wire strand. The wire strand adjacent to that wire strand is provided precisely shifted therefrom, so that a fabric with perpendicularly extending wire strands arises, which are each connected together in a positive-fit and/or force-fit manner in order to form a sturdy fabric. The highest height of the mesh typically arises at the turning points of the individual wire strands, i.e. at the locations where the wire strand is in contact with a wire strand extending transverse to it. This highest point determines the thickness of the wire mesh. The strands can also be welded to each other.

This wire mesh can be formed from a metallic wire or an electrically conductive wire made of different material, for example carbon. It is also possible to connect wire strands of different materials in the mesh or fabric to ensure, firstly, the necessary integrity of the wire structure, secondly, sufficient conduction and finally low weight. It is advantageous to form the wires to be thin. The wires should have a thickness from 0.15 mm (mesh 0.3 mm) to a maximum of 0.3 mm (mesh 0.6 mm) Swaging achieves a reduction in thickness of approx. 30-50% and increases rigidity. A larger aperture can be chosen, which saves costs and material. Less adhesive mass can then be used, which improves heat transfer. The thinner the wires, the less the sturdiness. The thicknesses given above refer to a wire that is swaged by about 50%. Swaging for an increase in strength can be between 30% and 50%. The wire mesh can be swaged using pressure. This results in greater sturdiness and less deformability. The electrical and thermal transition resistances are improved.

The conductor element may be formed in such a way that it forms on its inner surfaces abutting against the PTC element discrete support points with which the conductor element is electrically contacted to the PTC element. These support points accordingly project in the direction of the PTC element with a basically planar covering (totally or in part) of the conductor element and the PTC element or insulation, respectively. Such rather punctiform contact is preferable in view of a reliable introduction of the power current into the PTC element.

In particular when forming the conductor element from perforated sheet metal or stretch metal, the connection lugs projecting over the PTC element are typically directly formed integrally by the conductor element. Such connection lugs are used for a plug connection of the heat-generating element. The connection lugs are usually formed from sheet metal strips. The connection lugs can be soldered, welded or electrically conductively bonded to a mesh or knitted fabric forming the conductor element.

The mass is typically a mass having good thermal conductivity. The mass may have a thermal conductivity of at least 3 W/(m×K), preferably of at least 5 W/(m×K). The mass can be applied to the film with a technology used in the production of adhesive tapes, in which the film is passed over rollers through a bath consisting of the mass. It can be mixed with a solvent to adjust the viscosity of the mass. A plastic mass may be used as the mass, which after coating the film with the mass cures or hardens completely or in part. Cross-linking plastic material may be used, where it can also cure or cross-link in an accelerated manner by adding heat and/or having radiation act thereupon after the film has been coated. The device used in this method typically has a heating or irradiation section, through which the film coated with the mass passes.

In addition to the previously mentioned coating of the film, the mass can also be applied to the film by printing, calendering or spraying, where application with a doctor knife is preferable in the case of printing.

The mass can comprise filler material to adjust the thermal conductivity or electrical properties. The filler material can be ceramic and/or metallic particles.

The mass can be, for example, two-component silicone which is added gasoline or tuluol for dilution in the context of the production in order to obtain a viscosity at 25° C. in a range of between 4 and 15 Pa s, preferably between 5 and 8 Pa s.

The method according to the invention offers the advantage that, by pressing the conductor elements on, they are positioned and fixed relative to the film. Once the two conductor elements are placed onto the PTC element, the mass can also position the conductor elements relative to the PTC element.

The mass can have a relatively large portion of filler material which is formed from particles made of an electrically insulating material. Material with good thermal conductivity is preferably used, such as aluminum oxide. The portion of filler material should be at least 50 vol.-%, particularly preferably between 75 vol.-% and 95 vol.-%. The filler material particles are to be formed adapted to the through holes, so that the filler particles cannot congest the openings within the conductor element when the mass is pressed through the same. The filler material particles should have a diameter not exceeding 10% of the equivalent diameter of the through holes. Though the portion of filler material improves the thermal conductivity of the mass, a high content of filler material, however, also worsens the fluidity of the mass and thus inhibits the penetration of the mass into the through hole of the conductor element. A lower content of filler material is advantageous for a conductor element that has only a small aperture. Due to its massive nature, a relatively massive conductor element, which has only a few and/or small through holes for introducing the mass into the plane of the conductor element, also allows for good thermal conductivity within the plane containing the conductor element. With a relatively massive conductor element, the portion of filler material can also be small or the portion of filler material can be completely absent.

According to a preferred further development of the present invention, it is for this purpose proposed, when the conductor element is pressed on, to press the mass therethrough, so that the mass is provided on the side of the conductor element opposite to the film. Both conductor elements can undergo this treatment. Alternatively, only the one conductor element to which the PTC element is applied can be pressed on in the manner described above. Pressing the mass through the conductor element is to be effected such that the mass does not or only slightly project over the plane of the support points. When the PTC element is placed on, it should be connected in an electrically conductive manner to the conductor element after possibly applying a certain contact pressure. The mass is pushed back into the through hole by the PTC element being pressed on. However, an adhesive bond of the PTC element to the associated conductor element and the film arises, so that only a few parts have to be handled during the production method.

The mass should fill the through holes as completely as possible so that no voids or cavities remain in the plane of the heat-generating element defined by the conductor element, which improves decoupling the heat generated by the PTC element.

A method according to an aspect of the invention can be performed with two pieces of film, where each of the pieces of film is connected to one of the conductor elements. For further simplification of the method according to the invention, however, it is proposed to place at least two conductor elements on behind the other onto a continuous film. The other of the conductor elements is placed onto the PTC element in this procedure by folding the film over. Folding the film may be done using a rod which at the end side abuts against the PTC element, has approximately the thickness of the PTC element (extension in the height direction), and is enclosed by the latter when the film is folded over. The rod is then located between the foldover of the film and the PTC element. The rod has, for example, a semicircular cross-sectional shape, where the film extends around the convex circumferential portion of the rod and the circumferential portion of the rod extending straight at the end abuts against a face surface of the PTC element.

With a method according to an aspect of the invention, it is to be ensured after the placement of the conductor elements onto the film, that the mass is pressed largely through the conductor elements by pressing the conductor elements against the film, so that the mass is provided on both conductor elements also on the inner surface of the conductor elements that is disposed opposite to the film. After the placement of the other of the two conductor elements onto the PTC element, the mass is accordingly directly adjacent to and/or in abutment against the PTC element. These variants are conceivable, for example, at a single boundary surface between the conductor element and the PTC element. Because the conductor element usually abuts against the PTC element in a planar or full-surface manner, and it is conceivable that the mass in certain surface regions projects over the plane of the conductor element prior to the placement of the PTC element, whereas the mass in other surface regions of the conductor element is provided at the same height as the surface of the conductor element facing the PTC element or is recessed relative to this inner surface of the conductor element. In the case of a conductor element provided with support points, a full-surface abutment means that all support points provided over the entire surface of the conductor element abut against the contact surface of the PTC element.

After the placement of the other conductor elements, a layer structure consisting of the film layers with the mass, the conductor elements and the PTC element provided in between should preferably be pressed together. This allows the conductor elements to be electrically contacted in a full surface manner with the PTC element. Also, voids and defects should be filled by the mass in that the mass flows in the plane of the conductor element. This results in a good heat-conducting connection between the PTC element and the outer surface of the film. The film forms the outer surface of the finished product. A heat-dissipating element, for example a corrugated rib element of an air heater, can be laid against this film to dissipate the heat generated by the PTC element to the air to be heated. The heat-generating element produced in the manner described above can just as well be inserted into a U-shaped pocket of a water heater.

With regard to positioning the connection lugs or positioning the heat-generating element in an electric heating device used in a motor vehicle, the previously mentioned layer structure is preferably located in a frame-shaped casing made of an insulating material, for example, of plastic material. The connection lugs typically project over the casing. The casing has a casing opening which is formed to be suited to receive the previously mentioned layer structure. The layer structure is typically only pressed together after having been placed into the casing. Mass that has been pressed to the side beyond the PTC element can fill gaps between the frame-shaped casing and the layer structure, thereby improving heat decoupling from the PTC element and/or achieving an adhesive connection between the casing and the layer structure. Examples of such frame-shaped casings are described, for example, in EP 1 768 457 A1 or EP 2 637 474 A1. To avoid electrical flashover and stray voltage, the conductor elements usually have a base area that is smaller than the oppositely disposed main side surface of the PTC element against which the conductor element abuts. The conductor element can be recessed inwardly by 1 to 5 mm relative to the outer circumferential surface of the PTC element. The film, however, is larger than the conductor element and projects fully circumferentially over the conductor element. The film is also typically larger than the PTC element. The film then typically projects fully circumferentially over the base area of the PTC element. This also applies to the foldover, for which reason the latter has been folded around the rod. Only the connection lugs typically project laterally over such a layer structure. The connection lugs to the conductor elements, each of which by itself energizes the PTC element with a different polarity, project over the layer structure generally at a face side which enables the electrical connection to the heat-generating element.

According to a possible\further development of the present invention, the mass is a plastic mass which is applied onto the surface of the film and, for placement of the conductor elements, is set to a Shore-A hardness of between 25 and 40. The film has a thickness of between 50 microns and 100 microns. The layer thickness of the mass is regularly between 200 microns and 350 microns.

This hardness allows for a slight indentation of the conductor elements into the mass.

According to a possible further development of the present invention, the mass is a cross-linking plastic mass. The mass is pre-cross-linked prior to the placement of the sheet metal elements. In the pre-cross-linked state, the mass typically has the previously mentioned hardness values. The degree of cross-linking of the mass is between 40 and 70%. The final cross-linked mass has a Shore-A hardness of >70. This final cross-linking is usually obtained already at the end of the production of the heat-generating element and not only after a continuous operation of the heat-generating element in an electric heating device.

According to one further embodiment of the present invention, the mass is finally cross-linked by using external pressure and increased temperature after the placement of the other of the conductor elements together with the film adhering thereto. The pressure should be between 2 and 3.5 $N/mm^2$ The increased temperature should be between 100° C. and 200° C. This pressure can be so high that the mass is displaced into the plane that is assumed by the PTC element and this mass fully circumferentially surrounds the PTC element. The PTC element is thus received in the mass. Only the connection lugs protrude from the mass and project over the film. In a manner known per se, the heat-generating element can comprise a position frame that holds several PTC elements in a predetermined position, as is known from EP 1 768 457 A1 or EP 2 873 296 A1, respectively. Such a position frame can cover and seal the PTC elements on the edge side, as is known from this prior art.

For the satisfying the object pertaining to the device, the present invention specifies a heat-generating element having a PTC element and electrical conductor elements connected to the PTC element in an electrically conductive manner for energizing the PTC element with different polarities. An electrical insulation is provided on an outer side of the PTC element. A film and an adhesive mass are applied to the conductor elements. With the element according to the invention, the mass is provided in the plane of at least one of the conductor elements, which results in a good connection between the conductor element provided with the through hole and the insulation. In addition, the outer side of the heat-generating element shifts toward the PTC element, so that the heat conduction path is reduced, while providing good insulation.

One possible further development of the heat-generating element involves the mass being provided on a surface of the conductor element directly in contact with the PTC element. In this element, the PTC element also adheres to the conductor element by way of the mass, so that a permanent bond between the PTC element and the insulation is obtained in a simple manner. Disposed in the plane of the conductor element is typically only the conductor element itself and the mass. Therefore, good thermal conductivity is given.

The heat-generating element can also be provided with an EMC protection, for example, enveloped with an electrically conductive film. Edge areas of the heat-generating element can also be overmolded for sealing purposes.

BRIEF DESCRIPTION OF THE DRAWINGS

Further details and advantages of the present invention shall arise from the following embodiment of the invention with the drawing, in which.

DETAILED DESCRIPTION

Figure 1:
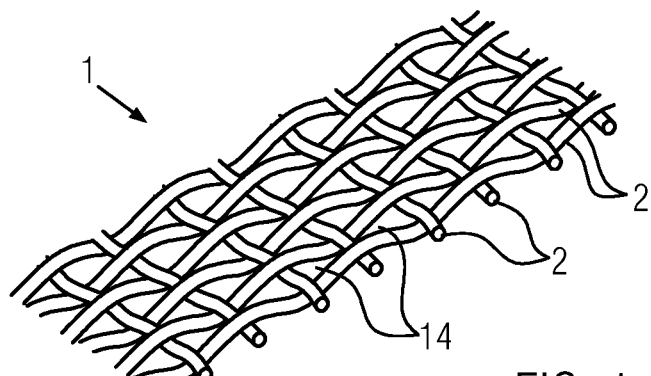
FIG. 1 shows a perspective view of a wire mesh provided with through holes as an embodiment of an electrical conductor element.

FIG. 1 shows in perspective view a wire mesh 1 with a plurality of wire strands 2 which are interwoven with each other. The wire strands 2 each extend at right angles to each other and are alternately passed through above and beneath one another, so that the mesh results in the typical manner.

At the intersection points of the wire strands, upper and lower discrete support points arise with which the wire mesh, which is an embodiment of an electrical conductor element provided with through holes, abuts in a punctiform but nevertheless planar manner against the oppositely disposed layers of a layer structure to be described below.

Figure 2A:
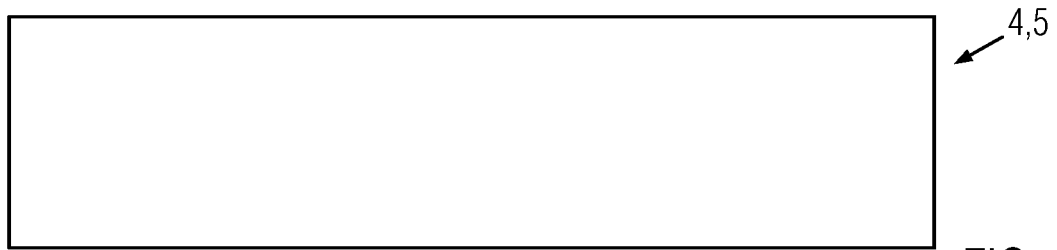
FIGS. 2a to 2d show top views for various method steps in the execution of an embodiment of the method according to the invention and FIGS. 3a to 3d show longitudinal sectional views of different phases of the embodiment.
Figure 2B:
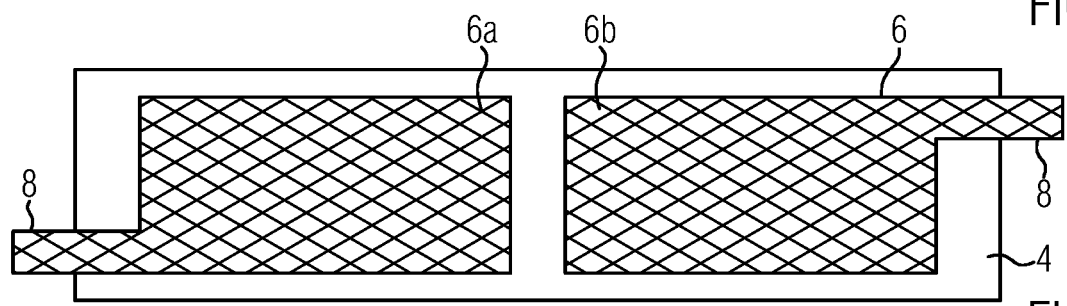
Figure 2C:
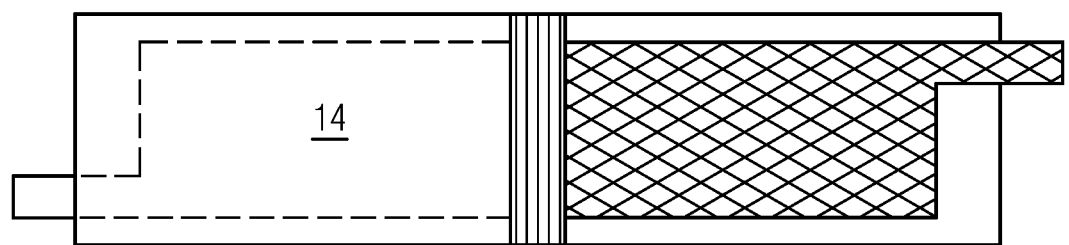
Figure 2D:
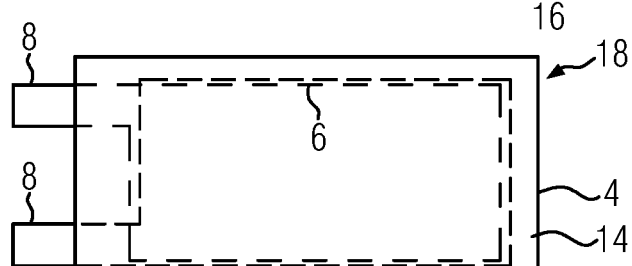
Figure 3A:
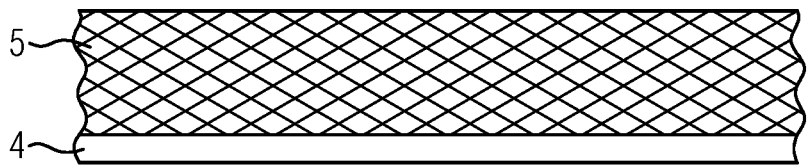

FIG. 2 shows a top view onto a film that has been provided with a mass; corresponding to this, FIG. 3a shows a longitudinal sectional view of an enlarged detail of the film with the mass, where the film is marked with reference numeral 4 and the mass with reference numeral 5. This film is cut off from a stock as a uniform piece of length. The stock contains a film 4 previously coated with the mass 5. The film 4 can be a polyimide film. The mass is two-component silicone which is provided with a thinner for setting a relatively low viscosity. Therefore, the mass 5 is relatively flowable. The mass 5 is already in part cross-linked in the starting material supplied. It has a shore-A hardness of between 25 and 40.

Figure 3B:
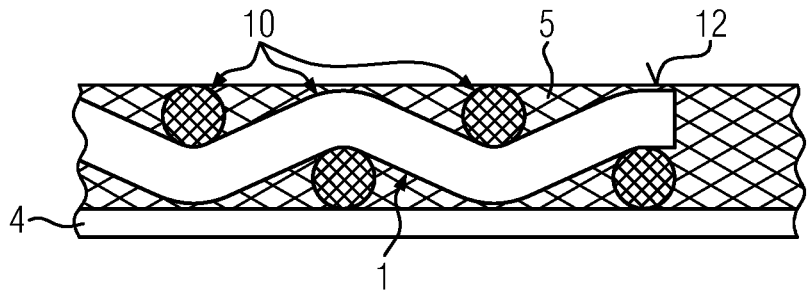

As illustrated by FIGS. 2b and 3b, electrical conductor elements 6 are placed onto this mass 5. The electrical conductor elements 6 are identically formed cut-outs of the wire mesh shown in FIG. 1 provided with a connection lug 8. The film 4 with the mass applied to it is evidently wider than the conductor element. The film 4 with the mass 5 therefore projects over the conductor element 6 in the width direction on both sides. The film 4 with the mass 5 has a corresponding projection also on the free face sides. There is a free space between the two conductor elements 6. The conductor elements 6 are spaced from each other.

As compared by FIG. 3b, the conductor element is not only placed onto the mass 5, but is additionally pressed into the mass 5. The conductor element 6 is pressed into the mass 5 such that discrete support points marked with reference numerals 10 at the intersection points of the wire strands 2 come to lie approximately at the same height as the outer surface of the mass 5 marked with reference numeral 12.

Figure 3C:
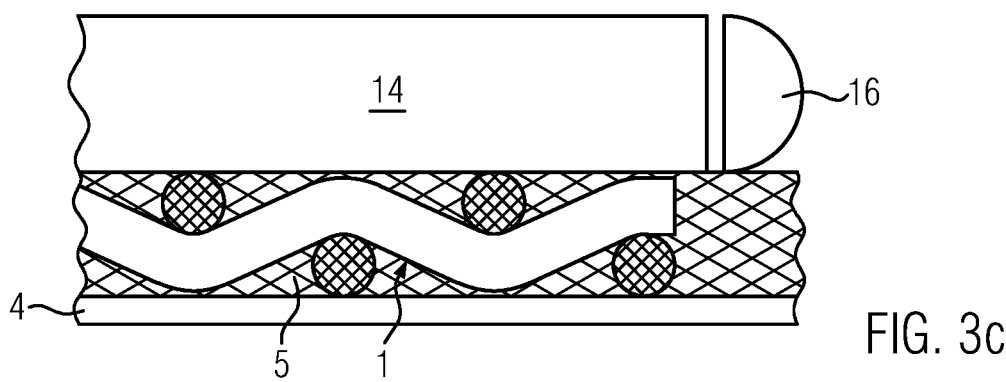

FIGS. 2c and 3c, respectively, illustrate the embodiment after placement of the PTC element, which is marked with reference numeral 14, onto the conductor element 6a on the right-hand side. The base area of the PTC element 14 is larger than the base area of the conductor element without the connection lugs 8. The dimensional relationships are evident from FIG. 2c in that the contour of the conductor element 6a on the left-hand side is dotted. FIG. 2c or 3c, respectively, also illustrates a rod 16 that is made of insulating material and is placed at the end side against the PTC element 14 and between the two conductor elements 6 onto the mass 5.

Shown in FIG. 2c is the embodiment in a top view after the film 4 has been folded over. The oppositely disposed film sections 4 cover each other. They form the outer surface of the heat-generating element marked with reference numeral 18 which has only the two connection lugs 8 projecting over the former. The connection lugs 8 in FIG. 2b provided in the longitudinal direction staggered relative to each other have the same extension in the longitudinal direction of the heat-generating element 18, but are in the width direction provided staggered relative to each other, whereby the air and creep distance between the two connection lugs 8, which serve to energize the heat-generating element 18 with the power current, is increased.

Figure 3D:
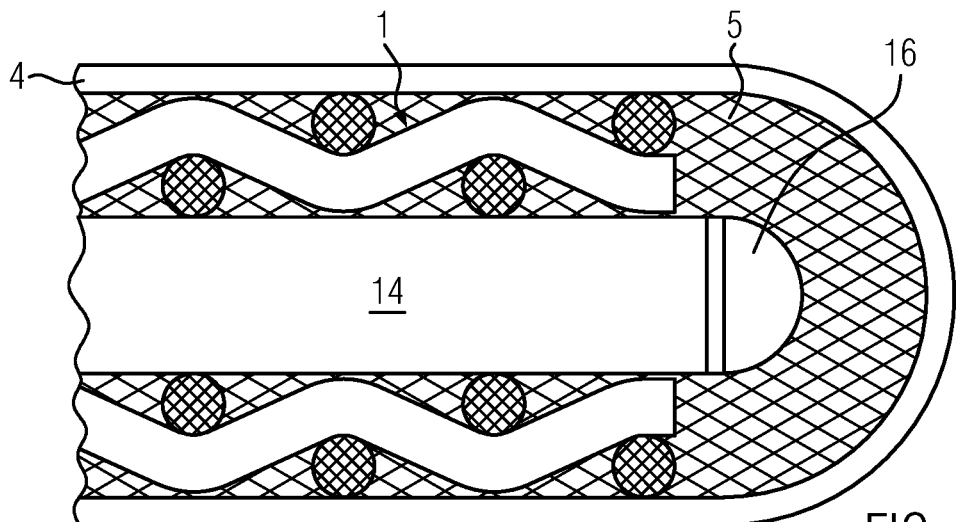

As illustrated in FIG. 3d, also the other conductor element 6b, illustrated in FIGS. 2b and 2c on the right-hand side, with its associated support points 10 abuts against the surface of the PTC element 14.

As illustrated by the sectional view according to FIG. 3d, the rod 16 abuts with a straight outer circumferential section against the substantially straight face surface of the PTC element 14. The rod 16 is a semicircular rod. The convex region is enclosed by the film 4.

We claim:

1. A method for producing a heat-generating element, comprising:
    placing at least two electrical conductor elements onto a film provided with an adhesive mass, wherein the conductor elements are provided with through holes and support points;
    pressing the electrical conductor elements against the film such that the mass is forced into the through holes such that the conductor elements are pressed into the mass, so that the support points of the conductor elements lie approximately at approximately a same height as an outer surface of the mass;
    subsequently placing at least one PTC element onto one of the conductor elements; then placing the other of the conductor elements, together with the film, opposite to the one of the conductor elements onto the PTC element; and
    disposing a rod onto the mass at an end side of the PTC element and between the at least two conductor elements.

2. The method according to claim 1, wherein the mass is pressed through at least one of the conductor elements when the conductor element is pressed onto the film so that the mass is provided on a side of the film that is disposed opposite to the conductor element.

3. The method according to claim 1, wherein at least two conductor elements are placed one behind the other onto a continuous film, and wherein the other of the conductor elements is placed onto the PTC element by folding the film over onto the PTC element.

4. The method according to claim 1, further comprising, after placement of the other of the conductor elements onto the PTC element, pressing together a layer structure including the film layers with the mass, the conductor elements, and the PTC element provided therebetween.

5. The method according to claim 1, wherein the mass is a plastic mass which is applied over a surface onto the films and which is set with a Shore-A hardness of between 25 and 40 for placement of the conductor elements.

6. The method according to claim 1, wherein the mass is a cross-linking plastic mass which is pre-cross-linked prior to the placement of the conductor elements to the PTC element.

7. The method according to claim 6, wherein the mass is finally cross-linked by using an external pressure and increased temperature after the placement of the other of the conductor elements, together with the film adhering thereto, onto the PTC element.

8. A heat-generating element comprising:
a PTC element;
electrical conductor elements connected to the PTC element in an electrically conductive manner for energizing the PTC element with different polarities;
an electrical insulation that is provided on an outer side of the PTC element with a film and an adhesive mass applied to the conductor elements prior to providing the electrical insulation on the outer side of the PTC element, wherein at least one of the conductor elements is provided with through holes and support points that lie at a same height as an outer surface of the mass; and
a rod disposed against an end side of the PTC element.

9. The heat-generating element according to claim 8, wherein the mass is provided on a surface of the conductor element directly in contact with the PTC element.

* * * * *